Oct. 2, 1934.   C. T. PFLUEGER   1,975,754
FISH STRINGER
Filed Oct. 10, 1931
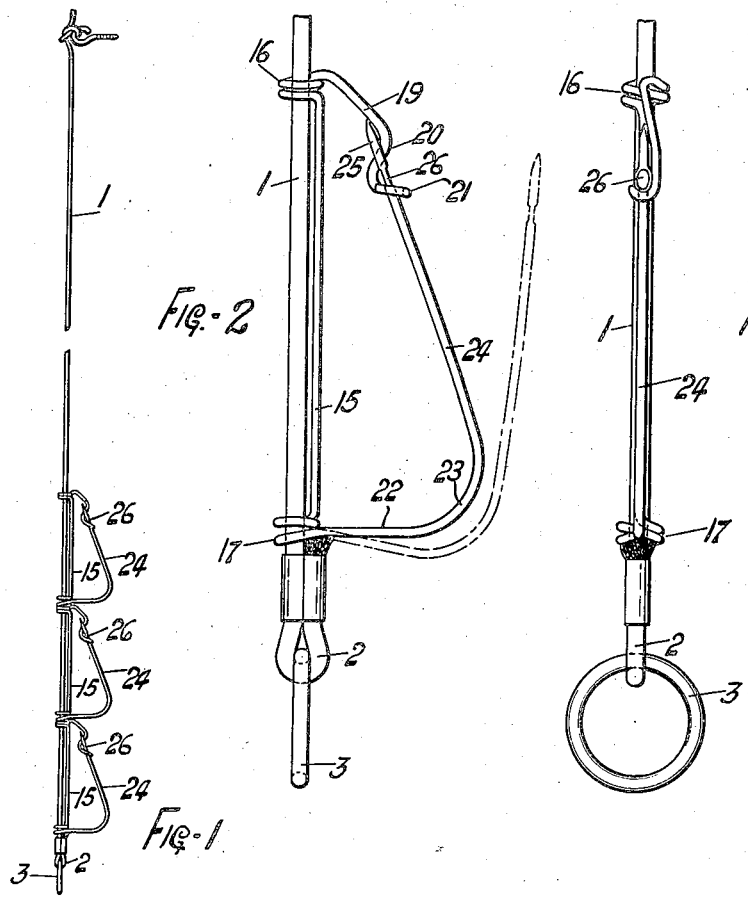
INVENTOR
CHARLES T. PFLUEGER
BY
Ely & Barrow
ATTORNEYS Patented Oct. 2, 1934

1,975,754

UNITED STATES PATENT OFFICE 1,975,754

FISH STRINGER

Charles T. Pflueger, Akron, Ohio, assignor to The Enterprise Manufacturing Company, Akron, Ohio, a corporation of Ohio Application October 10, 1931, Serial No. 568,172

6 Claims. (Cl. 224—7)

The present invention relates to new and improved fish supporting and stringing devices such as used for keeping fish alive after having been caught, the fish being carried upon a rope attached to the boat or wharf and allowed to remain in the water. The invention relates to that form or type of fish stringer in which individual and independent hooks are arranged on the string or cord so that the fish will not crowd upon the lower end of the stringer. It is the purpose of the invention to improve upon stringers of this type and to devise a better and unique form of stringer which will also be less expensive to manufacture than prior devices for similar purposes.

This and other objects of the invention will be apparent to those skilled in the art, it being the intention to show the best known or preferred form of the apparatus.

In the drawing:

Figure 1 shows a fish stringer provided with the new and improved fish holders;

Figure 2 is an enlarged side view showing one of the individual fish supports; and Figure 3 is a view taken at right angles to Figure 2.

The ordinary rope or heavy cord used for the purposes set forth is shown at 1, being looped at its lower end as shown at 2 to receive ring 3. The free end of the rope is secured to the boat or wharf.

When a fish is released from a hook, it is placed on one of the fish holders or supports shown in Figures 2 and 3. A number of these supports are placed on the rope 1 and the holders are strung along the line, each being independent of the others and being free to rotate about the rope in response to the movements of the fish. Only three of these holders are shown, but the number may be increased at the option of the fisherman and it is possible to retain a large number of fish without danger of the fish escaping or injuring one another. The fish have a very considerable freedom of movement and remain alive for a long period after they are caught. The holder is cheap and easy to manufacture and yet is strong and effective.

The holder is made of a single piece of spring wire coiled and shaped properly as shown. It is formed with a straight main stem or reach 15 that is formed with coils or eyes 16, 17 at its upper and lower ends respectively, said coils being offset laterally from the main stem 15, and being in alignment on a common axis that is parallel to said main stem. The rope 1 extends through coils 16, 17 without being bent or flexed thereby so that the holder rotates freely about the rope as an axis, and the coils of adjacent holders cannot so overlap each other as to limit or retard the rotation of the holders. From the coil 16 the wire is bent downwardly as at 19, and then given a reverse bend as at 20. The end of the wire is bent outwardly to form a U-shaped pocket or loop 21 opening inwardly. The other portion of the wire extending from the eye 17 is bent outwardly to form a substantially horizontal portion 22, then upwardly as at 23 on an easy curve to a long arm 24 which terminates in a point 25 and which is inserted in the gill. The end of the arm, when the holder is closed, is received in the loop 21, the point 25 lying beneath the bend 20 and protected thereby. Immediately below the point, the wire is enlarged as by flattening, as at 26, so that the arm cannot be withdrawn longitudinally from the loop. The tension in the wire will cause it to assume the dotted line position of Figure 2 when released from the loop.

The form of support or stringer may be varied from the exact details shown and described herein.

What is claimed is:

1. A fish stringer comprising a rope or the like and a fish support composed of a single wire having a main portion lying along the rope, axially aligned eyes at the ends of the main portion surrounding the rope and rotatable thereon, one end of the wire being formed as a loop and the other end formed with a fish supporting portion and an end received in the loop.

2. A fish stringer comprising a rope or the like and a fish support composed of a single wire having a portion lying along the rope and formed with laterally offset, axially aligned, coils at opposite ends loosely received over the rope, one end of the wire being bent toward the main portion and provided with an offset bend and a loop, the opposite end of the wire being received in the loop and in the rear of the offset portion.

3. A fish support comprising a single piece of spring wire having a curved arm adapted to be received in the gill of a fish, and a loop in which the end of the arm is received and by which the arm is held under tension of the wire, and axially aligned loops at the respective ends of the structure by which it may be supported upon a rope.

4. A fish support comprising spaced, axially aligned loops at the extremities thereof by which it may be supported upon a rope, a curved arm having a pointed end adapted to be received in the gill of a fish, a loop in which the pointed end of the arm is received and by which the arm is held under tension of the wire, and an enlargement on the arm below its point and above the loop by which it is prevented from longitudinal withdrawal.

5. A fish support comprising a single piece of spring wire having spaced, laterally offset, axially aligned, loops formed thereon by which it may be supported upon a rope, a curved arm adapted to be received in the gill of a fish, a loop at one end of the wire in which the end of the arm is received and by which the arm is held under tension of the wire, and an offset formation in the wire above the loop overlying the point of the arm.

6. A fish support consisting of a single piece of spring wire so bent as to provide offset, axially aligned loops at the respective extremities of its structure by which it may be strung on a rope, one end portion of the wire being formed as a curved, pointed arm receivable in the gill of a fish, the other end of the wire being formed as a loop in which the pointed end of the arm is received and by which the arm is held under tension of the wire, and an offset in the wire adjacent said loop and so disposed as to overlie the point of the arm.

CHARLES T. PFLUEGER.